United States Patent Office 3,020,302
Patented Feb. 6, 1962

3,020,302
NITROARYLFLUOROSILANES AND PROCESS FOR THEIR PRODUCTION
Donald L. Bailey, Snyder, N.Y., and Ronald M. Pike, Chelmsford, Mass., assignors to Union Carbide Corporation, a corporation of New York
No Drawing. Filed Oct. 30, 1959, Ser. No. 849,759
12 Claims. (Cl. 260—448.2)

This invention relates to organosilicon compounds and a process for their production.

This invention provides nitroarylfluorosilanes which can be represented by the formula:

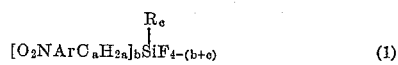
$$[O_2NArC_aH_{2a}]_b\overset{R_c}{\underset{|}{Si}}F_{4-(b+c)} \quad (1)$$

wherein Ar is a phenylene group, an alkyl-substituted phenylene group (e.g. a methyl-, ethyl-, propyl- or butyl-substituted phenylene group) or an alkoxy-substituted phenylene group (e.g. a methoxy-, ethoxy-, propoxy- or butoxy-substituted phenylene group), R is a monovalent hydrocarbon group free of aliphatic unsaturation (e.g. an alkyl group such as a methyl, ethyl or propyl group, an aryl group such as a phenyl group, an alkaryl group such as a tolyl group or an aralkyl group such as a beta-phenylethyl group), $a$ has a value from 0 to 8 and higher, $b$ has a value from 1 to 3, $c$ has a value from 0 to 2 and $(b+c)$ has a value from 1 to 3. In Formula 1 R can represent the same or different groups. In Formula 1 R is preferably a methyl group, Ar is preferably a phenyl group, $a$ preferably has a value from 0 to 4 and $b$ is preferably one. Illustrative of the nitroarylfluorosilanes represented by Formula 1 are: ortho-, meta- and para-nitrophenyltrifluorosilane, ortho-, meta- and para-nitrophenylmethyldifluorosilane, ortho-, meta- and para-nitrophenyldimethylfluorosilane, the beta-nitrophenylethyltrifluorosilanes, the nitrobenzylmethyldifluorosilanes, the nitrotolylmethyldifluorosilanes, the gamma - nitrophenylpropyltrifluorosilanes, the di(nitrophenyl)difluorosilanes and the tri(nitrophenyl)fluorosilanes.

This invention further provides a process for producing the nitroarylfluorosilanes represented by Formula 1 which involves nitrating an arylfluorosilane with a nitrating agent to produce a nitroarylfluorosilane.

The arylfluorosilanes that are used as starting materials in the process of this invention can be represented by the formula:

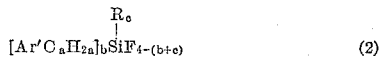
$$[Ar'C_aH_{2a}]_b\overset{R_c}{\underset{|}{Si}}F_{4-(b+c)} \quad (2)$$

wherein R, $a$, $b$, $c$ and $(b+c)$ have the above-defined meanings and Ar' represents a phenyl group, an alkyl-substituted phenyl group or an alkoxy-substituted group. Illustrative of the arylfluorosilanes represented by Formula 2 are: phenyltrifluorosilane, phenylmethyldifluorosilane, phenyldimethylfluorosilane, beta - phenylethyltrifluorosilane, benzylmethyldifluorosilane, tolylmethyldifluorosilane, gammaphenylpropyltrifluorosilane, diphenyldifluorosilane and triphenylfluorosilane.

Arylfluorosilanes represented by Formula 2 can be prepared by reacting the corresponding arylchlorosilanes with sodium silicofluoride ($Na_2SiF_6$).

Conventional nitrating agents can be employed to effect the nitration of the arylfluorosilanes represented by Formula 2 to produce nitroarylfluorosilanes according to the process of this invention. Useful nitrating agents include mixtures of nitric acid and sulfuric acid and mixtures of potassium nitrate and sulfuric acid. The use of stoichiometric amounts or up to about a 50% excess of the nitrating agent is preferred unless it is not desired to convert all of the aryl groups of the starting silanes to nitroaryl groups (in which case less than the above-indicated amounts can be used) or unless it is desired to produce compounds containing polynitroaryl groups (in which case more than the above-indicated amounts can be used).

Solvents can be employed, if desired, in the process of this invention. The solvents that are suitable for use in the process of this invention are liquid organic compounds that do not react with any of the components of reaction mixture (e.g. the nitrating agent, arylfluorosilanes and nitroarylfluorosilanes) and in which arylfluorosilanes are soluble. Useful solvents include halogen-substituted aliphatic compounds (e.g. carbon tetrachloride and chloroform). Amounts of solvent from 10 parts to 1000 parts by weight per 100 parts by weight of the starting arylfluorosilanes can be employed but amounts of solvent from 50 parts to 500 parts by weight per 100 parts by weight of the starting silane are preferred. These amounts are not critical and so other amounts can be used but no commensurate advantage is gained thereby.

At the completion of the nitration reaction the desired nitroarylfluorosilanes can be separated by any suitable means from the reaction mixture which usually contains the desired silane in one phase and the nitrating agent in another phase (e.g. by separating the phases with a separatory funnel and fractionally distilling the phase-containing the desired silane).

The temperature employed in the process of this invention is not narrowly critical and hence temperatures from $-5°$ C. to $100°$ C. can be used although temperatures from $0°$ C. to $60°$ C. are preferred. Other temperatures can be employed but no commensurate advantage is gained thereby.

The nitroarylfluorosilanes of this invention possess properties that are significantly different from the properties of nitroarylchlorosilanes. By way of illustration, these nitroarylfluorosilanes are considerably less reactive with sulfuric acid than are nitroarylchlorosilanes which readily form sulfates with sulfuric acid as illustrated by the skeletal equation:

$$-\overset{|}{\underset{|}{Si}}Cl_2 + H_2SO_4 \longrightarrow -\overset{|}{\underset{|}{Si}}SO_4 + 2HCl$$

As a further illustration, these nitroarylfluorosilanes have been found to have much greater hydrolytic stability than nitroarylchlorosilanes in the presence of sulfuric acid solutions containing up to about 20% by weight of water. In the presence of such sulfuric acid solutions, nitroarylchlorosilanes hydrolyze and condense within a few minutes to form nitroarylsiloxanes whereas nitroarylfluorosilanes do not hydrolyze and condense to a significant extent for an hour or longer.

The nitroarylfluorosilanes of this invention can be converted to nitroarylsiloxanes by conventional base-catalyzed hydrolysis and condensation procedures. By way of illustration, a nitroarylfluorosilane can be dissolved in a suitable solvent such as an ether, the solution so formed can be mixed with water that contains ammonium or sodium hydroxide in an amount in excess of that required to react with the hydrogen fluoride produced by the hydrolysis of the nitroarylfluorosilane. The resulting mixture can be agitated at about room temperature to produce a nitroarylsiloxane that can be reacted with conventional siloxanes by known acid catalyzed equilibration reactions to incorporate nitroaryl groups therein. Thus bis(nitroaryl)tetrahydrocarbondisiloxanes [e.g.

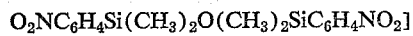
$$O_2NC_6H_4Si(CH_3)_2O(CH_3)_2SiC_6H_4NO_2]$$

can be equilibrated with other organopolysiloxanes [e.g. dimethylpolysiloxanes] to incorporate nitroaryldihydrocarbonsiloxy end-blocking or chain terminating groups therein. Nitroarylhydrocarbonsiloxanes [e.g.

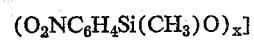
$$(O_2NC_6H_4Si(CH_3)O)_x]$$

can be equilibrated with other diorganosiloxanes [e.g. dimethylpolysiloxanes] to produce oils that can be used as hydraulic fluids. Trifunctional nitroarylsiloxanes [e.g. $(O_2NC_6H_4SiO_{1.5})_x$] can be used as protective coatings for metals. In addition these nitroarylsiloxanes can be reduced to produce aminoarylsiloxanes which can be reacted through the amino groups with organic polymers (e.g. alkyd resins) having functional groups that are reactive with amino groups (e.g. carboxy groups) in order to improve the properties (e.g. water repellency) of protective coatings for metals formed from the organic polymers.

Yields of nitroarylfluorosilanes of 80% and higher are generally produced in accordance with the process of this invention. These yields are significantly higher than the yields generally obtained when nitroarylchlorosilanes are produced by nitrating arylchlorosilanes (e.g. yields of up to about 30%). Furthermore, it is not necessary to conduct the proces of this invention under essentially anhydrous conditions or within a water-immiscible solvent which are required in the nitration of arylchlorosilanes to produce yields of nitroarylchlorosilanes as high as about 30%. Thus yields of nitroarylfluorosilanes of 80% and higher can be produced when the proces of this invention is conducted in the absence of a water-immiscible solvent employing a nitrating solution containing up to about 20% by weight of water.

The following examples illustrate the present invention:

Examples I to V illustrate the process for producing the compounds of this invention.

*Example I*

In a 3-liter, 3-necked, round bottom flask fitted with a sealed glas stirrer, thermometer and dropping funnel, was placed 474.5 grams (3.0 moles) of phenylmethyldifluorosilane dissolved in 1 liter of chloroform. In the dropping funnel was placed a nitrating solution containing 315 grams (210 ml.) of 90% by weight fuming nitric acid (4.5 moles of $HNO_3$) and 700 grams of concentrated sulfuric acid. The reaction flask was surrounded with an ice bath and stirring was commenced. The nitrating solution was added to the flask with stirring over a period of 20 to 40 min. while the reaction temperature was maintained between 15 and 30° C. After the addition was completed the ice bath was removed and stirring continued for an additional 30 minutes keeping the temperature below 30° by occasionally immersing the flask in an ice bath. Stirring was stopped and the two layers in the flask were separated in a separatory funnel. The lower acid layer was discarded. The organic layer was stripped of chloroform under reduced pressure and a mixture of ortho-, meta- and para-nitrophenylmethyldifluorosilane distilled under vacuum at a pressure of 5 mm. This experiment was repeated several times under essentially the same conditions. The yields of the mixtures of ortho-, meta- and para-nitrophenylmethyldifluorosilane in these experiments (B.P.=75° C. at 0.4 mm.) were from 90% to 95%.

*Example II*

Employing essentially the same conditions as in Example I, a 95% yield of a mixture of ortho-, meta- and para-nitrophenyltrifluorosilane ($O_2NC_6H_4SiF_3$) was obtained by nitrating phenyltrifluorosilane.

*Example III*

In a 3-liter, 3-necked round bottom flask fitted with a sealed stirrer, addition funnel and thermometer was placed 320 grams (1.5 moles) of dihpenyldifluorosilane dissolved in 1 liter of chloroform. The reaction flask was cooled to 10° C. with an ice bath. In the addition funnel was placed a nitrating solution containing 315 grams of fuming nitric acid dissolved in 700 grams of concentrated sulfuric acid. The nitrating solution was added to the flask over a period of one hour with stirring while keeping the temperature at 10-21° C. with the aid of the ice bath. Stirring was continued for an additional hour as the temperature rose to 30° C. The organic layer in the flask was then separated and stripped of solvent. The crude product so obtained was recrystallized from fresh chloroform. A total of 384 grams of mixture of isomeric di(nitrophenyl)difluorosilanes [$(O_2NC_6H_4)_2SiF_2$] was obtained in a yield of 82%; M.P.=107–108° C.

*Example IV*

In a 2-liter, 3-necked flask equipped with a sealed stirrer, dropping funnel, thermomenter and gas exit tube there were placed 395 grams (2.5 moles) of phenylmethyldifluorosilane and 700 milliliters of chloroform. To this was added from the dropping funnel, a solution of 185 milliliters (3.0 moles of $HNO_3$) of concentrated (70% by weight $HNO_3$) nitric acid and 700 grams of concentrated sulfuric acid over a period of one hour maintaining a reaction temperature of 25–35° C. with the aid of an ice bath. After the addition was complete, stirring was continued for an additional 30 minutes at 25–35° C. The chloroform layer was separated and the solvent removed under vacuum. The crude product was distilled under vacuum in a Vigreaux column. A total of 452 grams of a mixture of ortho-, meta- and para-nitrophenylmethyldifluorosilane, B.P. 78–89° C. at 1.3 mm. of Hg (yield 89%), were produced.

*Example V*

Into a 1-liter, 3-necked flask fitted with stirrer, dropping funnel, thermometer and ice bath was charged 119 grams (0.75 mole) of phenylmethyldifluorosilane

[$C_6H_5(CH_3)SiF_2$]

and 250 milliliters of spent acid of the following wt.-percent composition:

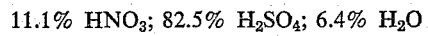
11.1% $HNO_3$; 82.5% $H_2SO_4$; 6.4% $H_2O$

To this stirred, cooled mixture was added a mixture of 78.5 grams (1.13 moles) of 90% by weight fuming nitric acid and 176 grams of concentrated sulfuric acid. The temperature during 20 minutes addition time ranged from 20–30° C. The mixture was stirred an additional 15 minutes at 25° C. The layers were separated. Distillation through a distillation column gave 143 grams (94% yield) of a mixture of ortho-, meta- and para-nitrophenylmethyldifluorosilane [$O_2NC_6H_4(CH_3)SiF_2$], boiling from 64° C. at 0.2 mm. of Hg to 73° C. at 0.4 mm. of Hg.

It should be noted that excellent yields of the desired silanes were obtained in Example V although the nitration was conducted in the presence of a substantial amount of water and in the absence of a water-immiscible organic solvent.

Examples VI and VII illustrate the low yields obtained in the production of nitroarylchlorosilanes.

*Example VI*

A 500 ml. Pyrex flask was charged with 75 milliliters of anhydrous chloroform and 25 grams of phenyltrichlorosilane. The mixture was stirred until the silane was dissolved and then the mixture was cooled to 0° C. in an ice bath. Over a 1 hour period, while stirring vigorously at 0° C. to 5° C., a mixture containing 6.3 milliliters of fuming nitric acid and 6 milliliters of 98% by weight sulfuric acid was added to the flask in a dropwise manner. The reaction mixture was stirred an additional hour at 0° C. to 5° C. The mixture which contained an acid layer and chloroform layer was transferred to a separatory funnel. The acid layer was separated and discarded. The chloroform layer was washed with 20 milliliters of 98% by weight sulfuric acid, and after removal of the acid layer, the chloroform layer was dried over calcium chloride and then filtered to remove the desiccant. The chloroform was distilled off at room temperature under reduced pressure. The residue was fractionally distilled and at a pressure of 1.5 mm. of mercury at 48° to 54° C. there was recovered 11.1 grams of unreated phenyltrichlorosilane. Then 4.7 grams of a mixture of ortho-, meta- and para-nitrophenyltrichlorosilane distilled over as a yellow oil at a pressure of 1.7 mm. of mercury at 99° to 102° C. All operations were carried out under a protective atmosphere of dry nitrogen. *Microanalysis.*—Calcd. for $C_6H_4O_2NCl_3Si$: Si, 10.9; Cl, 41.3. Found: Si, 11.3; Cl, 41.8. The yield of the mixture of silanes was 28%

*Example VII*

Twenty-five grams of phenylmethyldichlorosilane were dissolved in 100 milliliters of anhydrous chloroform contained in a 250 milliliter Pyrex flask. The reaction mixture so formed was cooled to 10° C. in an ice bath and over a 45 minute period at 8° to 10° C., while stirring vigorously, a mixture of 10.7 milliliters of fuming nitric acid in 30 milliliters of 98% by weight sulfuric acid was added in a dropwise manner. Stirred the mixture for an additional 10 minutes and then transferred to a separatory funnel. The acid layer was removed and discarded and the chloroform layer was dried over calcium chloride, and then filtered to remove desiccant. The filtrate was distilled at room temperature under reduced pressure to remove the chloroform. The residue was fractionally distilled at room temperature under reduced pressure to remove the chloroform. The residue was fractionally distilled and there was recovered 10.4 grams of unreacted phenylmethyldichlorosilane at a pressure of 3 mm. of mercury at 54° to 85° C. Then 2 grams of a mixture of ortho-, meta- and para-nitrophenylmethyldichlorosilane distilled over as a yellow oil at a pressure of 3.2 mm. of mercury at 118° to 122° C. All operations were carried out under a protective atmosphere of dry nitrogen. *Microanalysis.*— Calcd. for $C_7H_7O_2NCl_2Si$: Si, 11.9. Found: Si, 11.2. The yield of the mixture of silanes was 11%.

Examples VIII, IX and X illustrate the production of the starting arylfluorosilanes employed in the process of this invention.

*Example VIII*

In a 5-liter, 3-necked round bottomed flask equipped with a sealed glass stirrer, thermometer, and a fifteen inch distillation column having a distillation head leading to a Dry Ice trap and gas exit line, was placed 750 milliliters of tetralin, 2260 grams (12.0 mole) of $Na_2SiF_6$ and 1270 grams (6.0 moles) of phenyltrichlorosilane. The reaction mixture was stirred and heated to reflux under a gentle flow of nitrogen. When the temperature in the flask reached about 145° the product, crude phenyltrifluorosilane, started to distill through the distillation column. Heating and stirring were continued until no more product was collected. Boiling point of the crude product was 90–110° C. Total reaction time was about 2–3 hours.

*Example IX*

In a 5-liter, 2-necked round bottomed flask equipped with a sealed glass stirrer, thermometer, and a distillation column having a distillation heat leading to a Dry Ice trap and gas exit line, was placed 1141 grams (6.0 moles) of phenylmethyldichlorosilane, 1504 grams (8.0 moles) of $Na_2SiF_6$ and 750 milliliters of tetralin. The reaction mixture was heated to reflux with stirring under a gentle flow of nitrogen. The crude product, phenylmethyldifluorosilane, was collected until the temperature in the flask reached 195° over a period of 3 hours. Upon redistillation through the same column a total of 802 grams (conversion=85%) of phenylmethyldifluorosilane, B.P. 143–144.5°, was collected.

*Example X*

A 5-liter, 3-necked round bottomed flask was fitted with a stopper, sealed stirrer and a distillation column fitted with a still head. In the flask was placed 1471 grams (6.0 moles) of diphenyldichlorosilane, 1504 grams (8.0 moles) of $Na_2SiF_6$ and 600 milliliters of Arochlor solvent (chlorinated diphenyl). Accompanied by stirring the reaction mixture was heated to reflux and the crude diphenyldifluorosilane distilled out. Upon redistillation 1163 grams (91% yield) of diphenyldifluorosilane was obtained, B.P.=253–255° C.

This application is a continuation-in-part application of U.S. patent application Serial No. 655,505, filed April 29, 1957.

What is claimed is:

1. Nitroarylfluorosilanes represented by the formula:

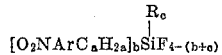

wherein Ar is a member selected from the group consisting of the phenylene group, the alkyl-substituted phenylene groups and the alkoxy-substituted phenylene groups, R is a monovalent hydrocarbon group free of aliphatic unsaturation; $a$ has a value from 0 to 8, $b$ has a value from 1 to 3, $c$ has a value from 0 to 2 and $(b+c)$ has a value from 1 to 3.

2. Nitroarylfluorosilanes represented by the formula:

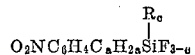

wherein R is a monovalent hydrocarbon group free of aliphatic unsaturation, $a$ has a value from 0 to 4 and $c$ has a value from 0 to 2.

3. Nitrophenylfluorosilanes represented by the formula:

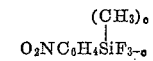

wherein $c$ has a value from 0 to 2.

4. Beta-nitrophenylethylfluorosilanes represented by the formula:

wherein $c$ has a value for 0 to 2.

5. Nitrophenyltrifluorosilanes represented by the formula:

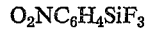

6. Nitrophenylmethyldifluorosilanes represented by the formula:

7. Di(nitrophenyl)difluorosilanes represented by the formula:

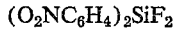

8. A process for producing nitroarylfluorosilanes represented by the formula:

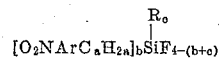

wherein Ar is a member selected from the group consisting of the phenylene group, the alkyl-substituted phenylene groups and the alkoxy-substituted phenylene groups, R is a monovalent hydrocarbon group free of aliphatic unsaturation, $a$ has a value from 0 to 8, $b$ has a value from 1 to 3, $c$ has a value from 0 to 2 and $(b+c)$ has a value from 1 to 3, which process comprises reacting (1) an arylfluorosilane that is represented by the formula:

wherein R, $a$, $b$, $c$ and $(b+c)$ have the above-defined meanings and Ar' is a member selected from the group consisting of the phenyl group, the alkyl-substituted phenyl groups and the alkoxy-substituted phenyl groups and (2) a nitrating agent to produce a nitroarylfluorosilane.

9. A process for producing nitroarylfluorosilanes represented by the formula:

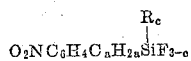

wherein R is a monovalent hydrocarbon group free of aliphatic unsaturation, $a$ has a value from 0 to 4 and $c$ has a value from 0 to 2, which process comprises reacting at a temperature from $-5°$ C. to $100°$ C. (1) an arylfluorosilane that is represented by the formula:

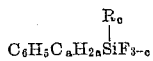

wherein R, $a$ and $c$ have the above-defined meanings and (2) nitric acid that is mixed with sulfuric acid to produce a nitroarylfluorosilane.

10. A process for producing nitrophenylmethyldifluorosilanes which comprises reacting phenylmethyldifluorosilanes with nitric acid that is mixed with sulfuric acid at a temperature from $0°$ C. to $60°$ C. to produce a nitrophenylmethyldifluorosilane.

11. A process for producing nitrophenyltrifluorosilanes which comprises reacting phenyltrifluorosilane with nitric acid that is mixed with sulfuric acid at a temperature from $0°$ C. to $60°$ C. to produce a nitrophenyltrifluorosilane.

12. A process for producing di(nitrophenyl)difluorosilanes which comprises reacting diphenyldifluorosilane and nitric acid that is mixed with sulfuric acid at a temperature from $0°$ C. to $60°$ C. to produce a di(nitrophenyl)difluorosilane.

References Cited in the file of this patent
UNITED STATES PATENTS 2,929,830    Kunowski _____ Mar. 22, 1960

FOREIGN PATENTS 534,818    Canada _____ Dec. 25, 1956

OTHER REFERENCES

Yakubovich et al.: Doklady Akad. Nauk, USSR, vol. 99, pp. 1015–8 (1954); (translation in "Organosilicon Literature," vol. 8).